(12) United States Patent
Li et al.

(10) Patent No.: US 12,518,550 B2
(45) Date of Patent: Jan. 6, 2026

(54) VIDEO PROCESSING METHOD AND RELATED DEVICES

(71) Applicant: Beijing ESWIN Computing Technology Co., Ltd., Beijing (CN)

(72) Inventors: Weiqi Li, Beijing (CN); Yuandong Huang, Beijing (CN); Andy Zhou, Beijing (CN)

(73) Assignee: Beijing ESWIN Computing Technology Co., Ltd, Beijing (CN)

( * ) Notice: Subject to any disclaimer, the term of this patent is extended or adjusted under 35 U.S.C. 154(b) by 448 days.

(21) Appl. No.: 18/090,840

(22) Filed: Dec. 29, 2022

(65) Prior Publication Data
US 2023/0334886 A1     Oct. 19, 2023

(30) Foreign Application Priority Data

Apr. 15, 2022   (CN) .......................... 202210396715.8

(51) Int. Cl.
*G06K 9/00*     (2022.01)
*G06T 5/50*     (2006.01)
(Continued)

(52) U.S. Cl.
CPC ................ *G06V 30/22* (2022.01); *G06T 5/50* (2013.01); *G06T 7/11* (2017.01); *G06V 10/25* (2022.01);
(Continued)

(58) Field of Classification Search
CPC ..... G06T 5/50; G06T 7/11; G06T 5/77; G06T 2207/10016; H04N 21/4318
See application file for complete search history.

(56) References Cited

U.S. PATENT DOCUMENTS

| | | | |
|---|---|---|---|
| 2012/0014672 A1* | 1/2012 | Kasuya | G06T 5/77 386/281 |
| 2017/0092333 A1* | 3/2017 | Li | G11B 27/22 |
| 2023/0290013 A1* | 9/2023 | Hsieh | G06T 7/11 |

FOREIGN PATENT DOCUMENTS

| | | |
|---|---|---|
| CN | 114860184 A | 8/2022 |
| CN | 114942742 A | 8/2022 |

OTHER PUBLICATIONS

Dickson, Paul E., W. Richards Adrion, and Allen R. Hanson. "Whiteboard content extraction and analysis for the classroom environment." 2008 Tenth IEEE International Symposium on Multimedia. IEEE, 2008. (Year: 2008).*

(Continued)

*Primary Examiner* — Gregory A Morse
*Assistant Examiner* — Owais Iqbal Memon
(74) *Attorney, Agent, or Firm* — Westman, Champlin & Koehler, P.A.

(57) ABSTRACT

A video processing method and related devices are provided. The method includes: acquiring board writing images of consecutive frames from a video with unobstructed board writing; calculating a difference area between the image of a current frame and a reference image; replacing a corresponding image block in the board writing image of the current frame with a corresponding image block in the reference image to obtain a new board writing image for each of the difference area; outputting the new board writing image to form a new video. The board writing image of the current frame are sequentially each board writing image after the board writing image of a first frame in the board writing images of the consecutive frames, and the reference image is the board writing image associated with a previous board writing image.

18 Claims, 7 Drawing Sheets

(51) Int. Cl.
  *G06T 7/11* (2017.01)
  *G06V 10/25* (2022.01)
  *G06V 10/56* (2022.01)
  *G06V 10/75* (2022.01)
  *G06V 30/22* (2022.01)

(52) U.S. Cl.
  CPC ............ *G06V 10/56* (2022.01); *G06V 10/751* (2022.01); *G06T 2207/20221* (2013.01)

(56) References Cited

OTHER PUBLICATIONS

Dickson, Paul E., et al. "Improved Whiteboard Processing for Lecture Capture." 2016 IEEE International Symposium on Multimedia (ISM). IEEE, 2016. (Year: 2016).*

* cited by examiner

Factorization, changing a polynomial into a
form of multiplication of several factors e.g. 2a(b+c) -2(b+c)
=2(b+c)(a-1)

Fig. 2

VIDEO PROCESSING METHOD AND RELATED DEVICES

CROSS-REFERENCE TO RELATED APPLICATION

This application claims priority to the Chinese Patent Application No. 202210396715.8, filed on Apr. 15, 2022, entitled "video processing method and related devices", and published as CN114945107A on Aug. 26, 2022, which is incorporated herein by reference in its entirety in this disclosure.

BACKGROUND OF THE DISCLOSURE

Field of Technology

The present disclosure relates to a field of electronic teaching, and in particular, to a video processing method and related devices.

Description of the Related Art

With universal and popularization of online classes, videos for teaching become an indispensable educational resource. The video for teaching is obtained by shooting a teaching scene by a camera. In the teaching scene, a teacher may teach through writing contents on a writing board, and writing contents of the writing board are important for understanding videos.

SUMMARY

In order to solve the above technical problem, the present disclosure provides a video processing method and related devices.

According to a first aspect of the present disclosure, there is provided a video processing method, comprising:
  acquiring board writing images of consecutive frames from a video with unobstructed board writing;
  calculating a difference area between the board writing image of a current frame and a reference image;
  replacing a corresponding image block in the board writing image of the current frame with a corresponding image block in the reference image to obtain a new board writing image for each of the difference area;
  outputting the new board writing image to form a new video,
  wherein the board writing image of the current frame are sequentially each board writing image after the board writing image of a first frame in the board writing images of the consecutive frames, and the reference image is the board writing image associated with a previous board writing image.

Optionally, for the board writing image of a second frame in the board writing image of the consecutive frames served as the board writing image of the current frame, the reference image is the board writing image of the first frame, and for the board writing image after the second frame served as the board writing image of the current frame, the reference image is a new board writing image associated with a previous board writing image.

Optionally, for the board writing image of a second frame in the board writing image of the consecutive frames served as the board writing image of the current frame, the reference image is an image obtained by fusing images of a plurality of frames without a board writing content in the video with unobstructed board writing.

Optionally, the video with unobstructed board writing is obtained by following steps: extracting a board writing content from an original video; completing the board writing content shielded by a teacher; and synthesizing a completed board writing content with the original video.

Optionally, wherein calculating a difference area between the board writing image of a current frame and a reference image comprises:
  calculating a difference in pixel level between the board writing image of the current frame and the reference image, and obtaining the difference area based on pixels with the difference larger than a difference threshold value, or,
  dividing the board writing image of the current frame and the reference image into a plurality of image blocks respectively, and taking the image block with a difference of the image blocks larger than a difference threshold as the difference area.

Optionally, further comprising: expanding an irregular shaped difference area to a regular shaped difference area.

Optionally, further comprising: adjusting a color of a writing board in the new board writing image.

Optionally, adjusting a color of a board in the new board writing image comprises:
  obtaining a corrected board writing image, wherein the corrected board writing image only comprises a writable effective area, and comprise no frame of the writing board and no board writing content;
  calculating an average value of each color channel of the corrected board writing image or obtaining a constant value of each color channel preset by a user;
  for a dark color writing board, modifying a pixel value of each color channel in the new board writing image, which is smaller than a first threshold value, into an average value of the color channel or a constant value of each color channel preset by a user; and
  for a light color writing board, modifying a pixel value of each color channel in the new board writing image, which is larger than the second threshold value, into an average value of the color channel or a constant value of each color channel preset by a user.

According to a second aspect of the present disclosure, there is provided a video processing device, comprising:
  a board writing debouncing module for performing the video processing method according to any one of claims 1 to 6 and outputting the new board writing image; and
  a board writing background color control module for adjusting a color of a writing board in the new board writing image.

According to a third aspect of the present disclosure, there is provided an electronic device, comprising: a processor, a memory and a program stored in the memory and executable on the processor, wherein the program carries out steps of the video processing method according to any one of claims 1 to 8 when executed by the processor.

According to a forth aspect of the present disclosure, there is provided a computer readable storage medium, a computer program or an instruction is stored in the computer readable storage medium which carries out steps of the video processing method according to any one of claims 1 to 8 when executed by the processor.

The present disclosure provides a video processing method for solving a problem of writing bounce in the image by associating the board writing images of consecutive frames. Furthermore, achieving a method for controlling a base color of the writing board which is capable of controlling a background color of the writing board in a process of transparent display of the board writing image, so that the image is closer to a real scene.

It should be understood that both foregoing general description and following detailed description are exemplary and explanatory only and are not restrictive of the present disclosure.

BRIEF DESCRIPTION OF THE DRAWINGS

The above and other purposes, features and advantages of the present disclosure will be more clear through following descriptions of the embodiments of the present disclosure with reference to accompanying drawings, in which:

FIG. 2 is for illustrating an exemplary frame image in a video with unobstructed board writing;

DETAILED DESCRIPTION OF THE DISCLOSURE

Figure 1:
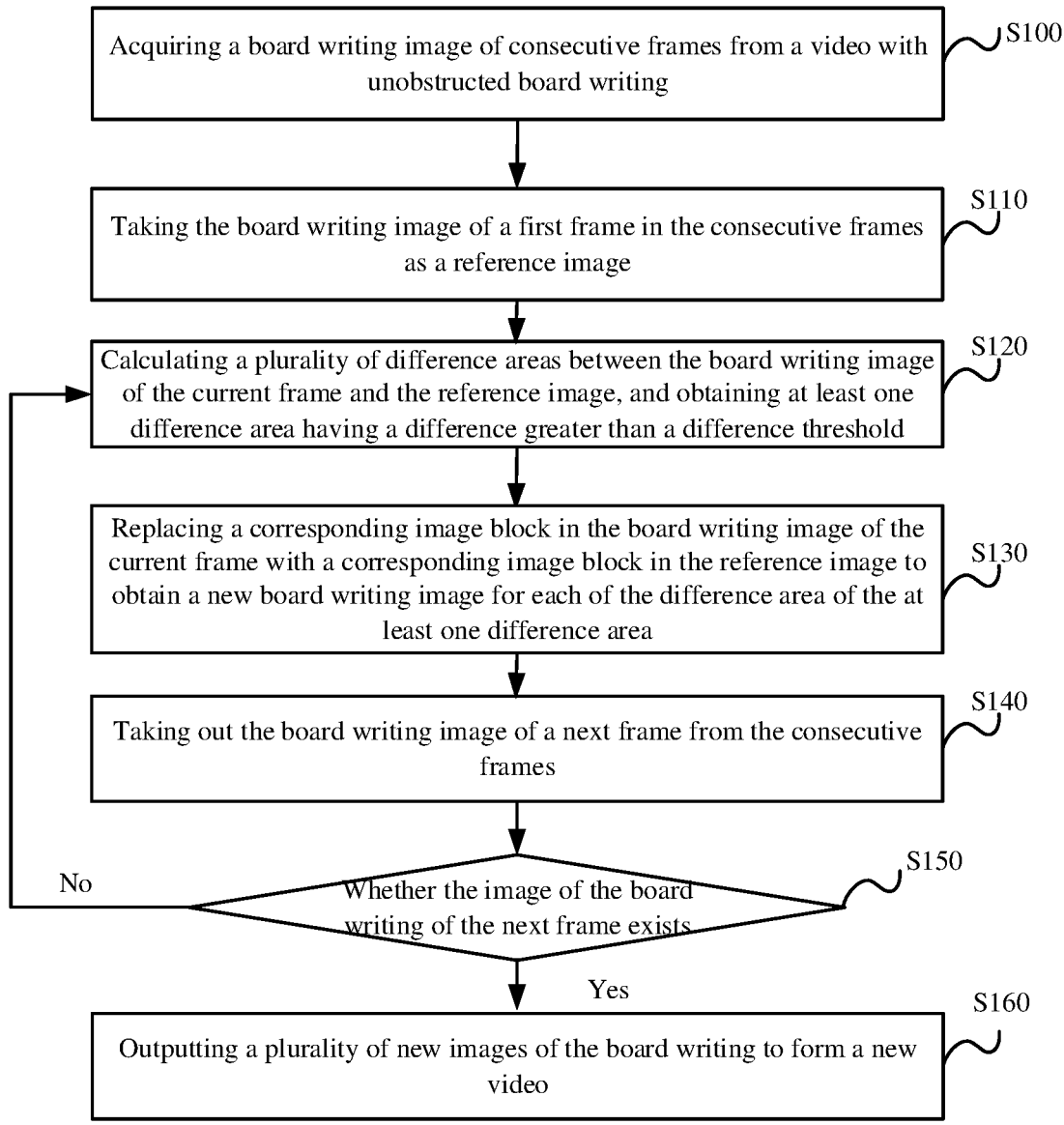
FIG. 1 is a flowchart of a video processing method according to an embodiment of the present disclosure.

To facilitate an understanding of the present disclosure, the present disclosure will be described in more detail below with reference to accompanying drawings. Preferred embodiments of the present disclosure are provided in the accompanying drawings. However, the present disclosure may be embodied in different forms and is not limited to the embodiments described herein. Rather, these embodiments are provided so that this disclosure will be clear and thorough.

Following concepts are used herein:

Writing board: boards for writing content in a variety of scenes, such as teaching or meetings, and include, but are not limited to, blackboards, green-boards, and blue-boards, whiteboards. A writing board to which the present disclosure relates include, but is not limited to, the blackboard, the green-board, the blue-board, and the whiteboard, and even an electronic board, and for convenience and brevity of following description, these writing media are collectively referred to herein as writing boards. Wherein white or light color writing boards are called as light board; dark color writing boards such as blackboard and green-board are called dark color writing board.

Board writing content: contents written on the writing board include, but are not limited to, the embodiment in form of words, symbols, diagrams, and the like, and the embodiment of the board writing content is collectively referred to as characters in the present disclosure.

Gray scale image: an image represented in grayscale. Any non-grayscale image may be converted to the gray scale image. Specifically, since any color is composed of three primary colors of red, green and blue, if a color of a certain pixel point is originally represented as (R, G, B) in a RGB space, a gray level Gray of the pixel point after being converted into the gray scale image is R, G, B weighted sum.

However, a video for teaching mentioned in the related art may cause the writing contents of the board writing presented by the video not complete because of a teacher blocking the writing board. Therefore, in a scheme of completing the board writing content extraction and shielded content, by extracting the board writing content form a video shot on site, the shielded content is completed to obtain a complete board writing content, and finally the complete board writing content and the video shot on site are synthesized to obtain a video without shielding of the board writing, so that students watching courses through the video cannot miss important contents because of the teacher shielding the board writing, and a classroom experience of the students is greatly improved. Of course, this process may also be applied to video in scenarios such as meetings, training, etc.

However, in the video shot on site, some slight differences exist among board writing images of consecutive frames, wherein the difference of handwriting edges of board writing contents may cause a phenomenon that handwriting bounces exist in the board writing contents viewed by human eyes when the video is played, and the handwriting bounces mean that the handwriting edges of a same handwriting at a same position consecutively bounce when the same handwriting at the same position is viewed, so that an impression is influenced.

FIG. 1 is a flowchart of a video processing method according to an embodiment of the present disclosure. As shown in the reference figure, following steps are included.

In step S100, acquiring a board writing image of consecutive frames from a video with unobstructed board writing.

In step S110, taking the board writing image of a first frame in the consecutive frames as a reference image.

Wherein, the video with unobstructed board writing in step S100 requires that board writing content in the board writing image of each frame in the corresponding video is completely presented. Since a teacher may teach through writing content on a writing board in a teaching scene, if the teacher shields the writing content at a certain moment when is teaching, a phenomenon that the writing content in the image of a certain frame is shielded appears in the video, so that an original video obtained through shooting by a camera is not the video with unobstructed board writing, and the video with unobstructed board writing may be obtained through a scheme of extracting the writing content and completing a shielded content. An exemplary frame image in the video with unobstructed board writing obtained by the scheme is shown in FIG. 2, and it may be seen from the drawing that the board writing content may be completely presented, and the teacher as a transparent layer does not influence complete presentation of the board writing content.

Operations of steps S100 and S110 include: taking the video with unobstructed board writing as an input of this step, acquiring board writing images of consecutive frames from a moment when the video starts to have the board writing content, then taking the board writing image of a first frame in the consecutive frames as a reference image of a primary cycle, and then taking one of the board writing images from the consecutive frames as the board writing image of a current frame. Here, the board writing image refers to an image having the board writing content.

In step S120, calculating a plurality of difference areas between the board writing image of the current frame and the reference image, and obtaining at least one difference area having a difference greater than a difference threshold.

It is known that different video streams use different color spaces, such as RGB and YUV. An example of RGB is used to illustrate how this step should be calculated. In a RGB color space, R values, G values, and B values are used to represent each pixel point in the frame image, and each frame image includes, for example, 640×480 pixel points, and then a maximum value of the R values, G values, and B values is 255, a minimum value is 0, when RGB is 255, a presented color is white, and when RGB is 0, the presented color is black.

Figure 3A:
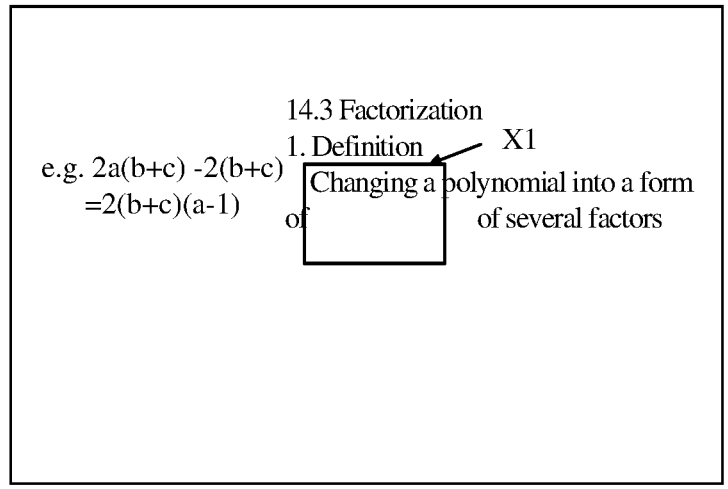
FIG. 3a and FIG. 3b are for illustrating corresponding image blocks of two images in a reference area.
Figure 3B:
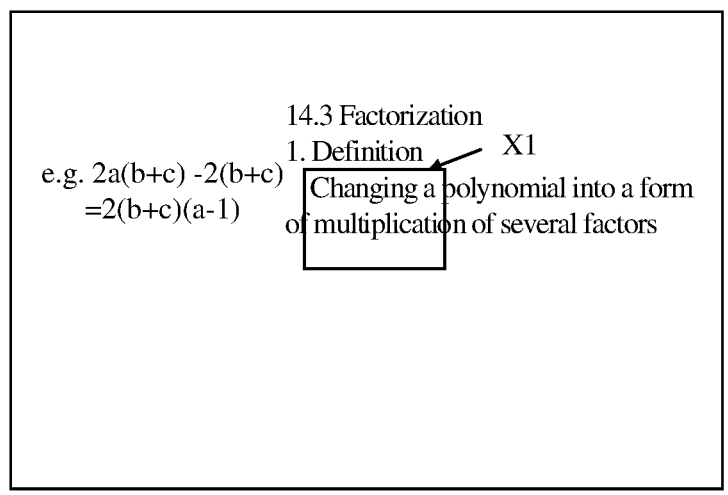

As an embodiment of this step, based on RGB, calculating average RGB values of each pixel of an extracted board writing image and the reference image respectively, and a formula is: average RGB value=(R value+G value+B value)/3, then comparing the average RGB values of the extracted board writing image and the reference image in a corresponding position, and if a difference value is greater than a preset difference threshold value, recording the corresponding position of the pixel in a first set, and finally constructing a difference area according to the first set. FIG. 3a and FIG. 3b are used for illustrating corresponding image blocks X1 and X2 of two images in a reference area, but it should be noted that the image blocks X1 and X2 shown on the figures are all in a regular form, but the difference area obtained by the present embodiment may be in an irregular shape. Optionally, an irregular shaped difference area is expanded to be in a regular shape to facilitate subsequent steps. In addition, the present embodiment may output two or more difference areas.

As another embodiment of this step, based on RGB, converting the extracted board writing image and the reference image into gray scale images, and then comparing corresponding pixels in two grayscale images based on the above embodiment to obtain the difference area.

As a third embodiment of this step, based on RGB, since a difference between board writing images of two consecutive frames is very small, the extracted board writing image and the reference image may be divided into a plurality of image blocks, then calculating average values of all R values, G values, and B values of each image block, comparing the average values of the corresponding image blocks, then extracting and dividing the image block whose difference is greater than a first threshold into a plurality of image blocks, calculating an average value of a sum of all R values, G values, and B values of each image block, comparing the average values of the corresponding image blocks, acquiring the image block whose difference is greater than a second threshold, and so on, until the image block whose difference is greater than an Nth threshold is obtained, and acquiring the difference area according to the image block whose difference is greater than the Nth threshold. It is to be understood that the first through Nth thresholds may be different, for example, gradually increasing.

In step S130, replacing a corresponding image block in the board writing image of the current frame with a corresponding image block in the reference image to obtain a new board writing image for each of the difference area of the at least one difference area.

In step S140, taking out the board writing image of a next frame from the consecutive frames.

Steps S130 and S140 may continue to refer to FIG. 3b, assuming that X2 is an image block whose difference area corresponds to the reference image and X1 is an image block whose difference area corresponds to the extracted board writing image, then replacing X1 with X2 to obtain the new board writing image, and replacing the reference image with the new board writing image, and then taking out the board writing image of the next frame from the video with unobstructed board writing.

In step S150, judging whether the board writing image of the next frame exists. A final operation of step S140 is to take out the board writing image of the next frame from the consecutive frames, if this operation is successful, it indicates that the board writing image of the current frame is not the board writing image of a last frame, and the board writing image of the next frame exists, it jumps to step S120, and if this operation is failed, it indicates that the board writing image of the current frame is the board writing image of a last frame, and the board writing image of the next frame does not exist, it jumps out of a loop, and step S160 is executed.

In step S160, outputting a plurality of new board writing images to form a new video.

In the present embodiment, the reference image is the board writing image associated with the board writing image of the current frame, which is changed in the loop, so that a new reference image may be obtained anew at the end of each loop. With reference to the drawings, that is, in the loop includes steps S120 to S150, the reference image of the first loop is the first frame board writing image in the consecutive frames, but at the end of each loop, a new reference image may be newly obtained, which is still the board writing image associated with the board writing image of the current frame, and then the next loop is performed based on the new reference image. An end condition of the loop is to take out all the board writing images. After the loop is executed, a plurality of board writing image are obtained, the new board writing images are combined into the new video according to a time sequence, and frames in the new video are associated, so that the phenomenon of handwriting bounces is avoided.

To illustrate the above embodiments, a more specific example (example one) is set forth. For example, if the video with unobstructed board writing is Video_input={f1, f2, . . . , fn}, n is a positive integer, and f1 to fn represent temporally consecutive frame images, in a first loop, comparing f1 and f2 to obtain the difference area, image blocks corresponding to the difference area in f1 and f2 are f1_patch and f2_patch respectively, and then replacing f1_patch in f1 with f2_patch to obtain f2'; then in a second cycle, comparing f2' and f3' to obtain the difference area, image blocks corresponding to the difference area in f2' and f3' are f2'_patch and f3_patch respectively, and then replacing f2'_patch in f2' with f3_patch to obtain f3'; and so on, finally (n−1) frame images f2' to fn' are obtained, and then a sequence Video_input={f1, f2', . . . , fn'} is output as the new Video.

In other examples, a time interval may be lengthened, refreshing once every interval of n1 frames, that is, reselecting an initial reference image every interval of n1 frames. For example, the video with unobstructed board writing is Video_input={f1, f2, . . . , fn1, fn1+1 . . . , fn}, wherein fn1 is a frame in middle, and all sequences before fn1 are processed to {f1, f2', . . . , fn1'} according to the previous example one. When fn1+1 is processed, a difference calculation is not performed (no processing is performed), and fn1+1 is output directly (served as a role of f1 in the previous processing stage, and served as the reference image), and following sequence is executed again according to the example one to obtain {fn1+1, ..., fn'}. A resulting time sequence is {f1, f2', ..., fn1', fn1+1, ..., fn'}, wherein fn1+1 is equivalent to a frame of refresh, thus achieving an effect of overall debounce.

In some embodiments, the reference image of a first loop may be another image, for example, fusing images of several frames without a board writing content of the video with unobstructed board writing, and a fused image serves as the reference image, or shooting a board writing image without the board writing content with appropriate light and angle as the reference image by using a camera device.

In some embodiments, for each frame image in above sequence, for example {f2', ..., fn'}, edge smoothing and enhancement processing of character, which makes line thickness of the character as uniform as possible and renders black within stroke, may also be performed. The edge smoothing and enhancement processing of the character enable lines of each character of the board writing content to be thicker and clearer, and therefore a phenomenon that the board writing is unclear due to the image block replacing step is avoided.

Figure 4:
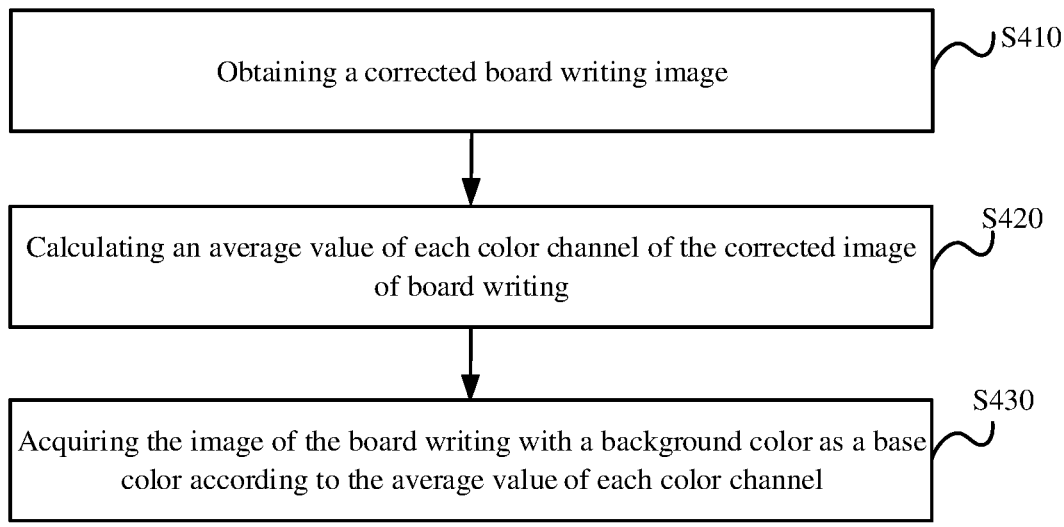
FIG. 4 is a flowchart of a method for converting an image of a board writing into a board writing image with a base color of a writing board according to an embodiment of the present disclosure.

Since the writing board and the writing board content in the video with the writing board unobstructed are often replaced by a white writing board and a black writing board content or replaced by a black writing board and a white writing board content, which is not associated with an original color of the writing board, and immersion and interestingness are slightly poor when the writing board is in transparent display. Thus, as a preferred embodiment, a color of the writing board may also be controlled, where the color of the writing board may be used as a background color for entire video. Control of the color of the writing board may be set as a selectable item and controlled by corresponding command parameters. For example, if a color control of the writing board is started, a base color of the writing board or the color of the writing board preset by the user is used for displaying, the steps in FIG. 4 are executed to process to obtain an image with the base color of the writing board or the color of the writing board preset by the user, otherwise, a default color of the writing board and the color of the board writing content are used for outputting the video, if the writing board is a dark color writing board, a default background color is black, and the handwriting is white, and if the writing board is a light color writing board, the default background color is white and the handwriting is black.

In step S410, obtaining a corrected board writing image $I_{rgb}$, wherein the corrected board writing image only comprises a writable effective area, and comprise no frame of the writing board and no board writing content. The corrected board writing image $I_{rgb}$ may be obtained according to an original video.

In step S420, calculating an average value of each color channel of the corrected board writing image, wherein an average value of the R channel is R_mean which is obtained by accumulating R value of all pixels and divide it by a total number of pixels, an average value of the G channel is G_mean which is obtained by accumulating G value of all pixels and divide it by a total number of pixels, an average value of the B channel is B_mean which is obtained by accumulating B value of all pixels and divide it by a total number of pixels.

In step S430, acquiring the board writing image with a background color as a base color according to the average value of each color channel, for example, for each pixel point in the dark color writing board, if the R value of the pixel point is smaller than a first threshold, the R value of the pixel point is replaced by the R_mean, otherwise, the R value of the pixel point is retained, the steps of judging and replacing the G value and the B value of each pixel point are performed by the same scheme, and finally, the writing board in the board writing image is replaced by the dark color writing board. However, for each pixel point in the light color writing board, if the R value of the pixel point is greater than a second threshold, the R value of the pixel point is replaced by the R_mean, otherwise, the R value of the pixel point is retained, the steps of judging and replacing the G value and the B value of each pixel point are performed by the same scheme, and finally, the writing board in the board writing image is replaced by the light color writing board. The first threshold and the second threshold may be set by themselves, for example, to be intermediate values between 0 and 255.

In addition, if the writing board is desired to be set to a color of the writing board preset by the user, for a dark color writing board, if the R value, G value or B value of a pixel is smaller than a corresponding threshold, constant value of the corresponding color channel preset by the user is used to fill and replace the R value, G value or B value of the pixel, and for a light color writing board, the constant value of the corresponding color channel preset by the user is used to fill and replace the R value, G value or B value of the pixel.

Figure 5:
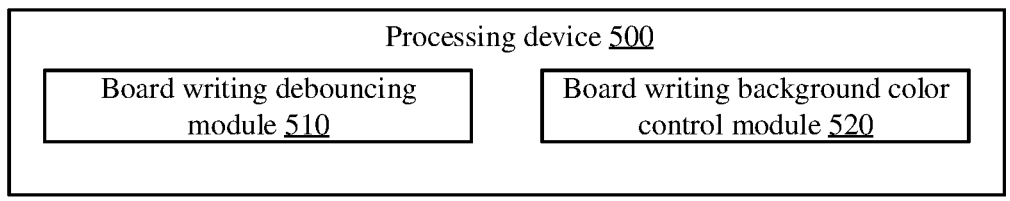
FIG. 5 is a schematic diagram of a video processing device according to an embodiment of the present disclosure.

The present disclosure also proposes a video processing device, as shown in FIG. 5. The device 500 includes a board writing debouncing module 510 and a board writing background color control module 520. The board writing debounce module 510 may perform the video processing method mentioned in the above embodiments (excluding the embodiment of FIG. 4) to obtain the new video, which does not have the problem of handwriting shake in the picture due to an association between the board writing images of the consecutive frames.

The board writing background color control module 520 is used for controlling the background color of the writing board in an output video. In particular, the color of the writing board may be controlled using a command parameter, which may determine, for example, whether to use the default background color or an original base color of the writing board. If the original base color of the writing board is used, the steps of FIG. 4 may be followed. The board writing background color control module 520 is capable of achieving a control of the background color of the board writing in a transparent display process of the board writing image, so that the picture is closer to a real scene.

It should be understood that, when the board writing debouncing module 510 and the board writing background color control module 520 are implemented as computer programs, they may be independent of each other, and both of the two function modules may be implemented as plug-in libraries for user and software and hardware platform to call.

In conclusion, through the module or the method, a generated video is stable in picture display and has a presentation effect close to the real scene, so that understanding and memorizing of the board writing contents by students may be guaranteed, and a classroom substitution feeling is enhanced.

Figure 6:
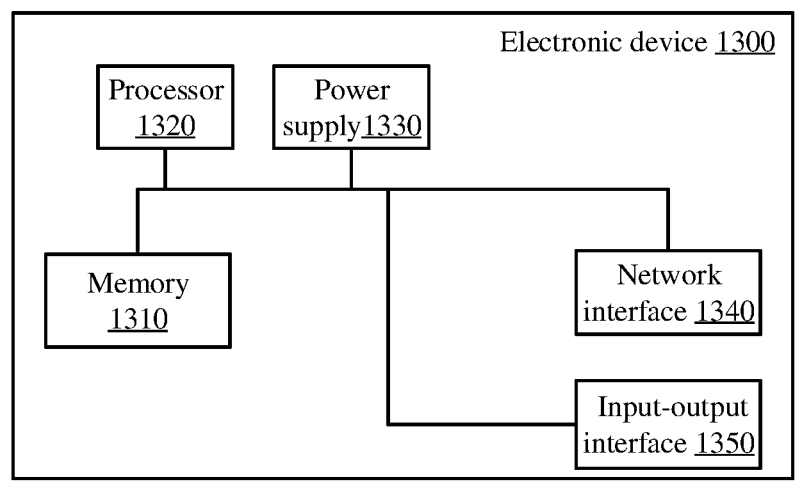
FIG. 6 is a schematic diagram of an electronic device for implementing various embodiments of the present disclosure.

An electronic device 1300 is further provided in an embodiment of the present disclosure, as shown in FIG. 6, and includes a memory 1310, a processor 1320, and a program that is stored in the memory 1310 and is executable on the processor 1320, and when the program is executed by the processor 1320, the program may implement each process of each embodiment in the video processing method, and may achieve a same technical effect, and in order to avoid repetition, details are not repeated here. Of course, the electronic device may also include auxiliary sub-devices such as a power supply 1330, a network interface 1340, and an input-output interface 1350.

It will be understood by those skilled in the art that all or part of the steps of the methods of the above embodiments may be performed by instructions or by instructions controlling associated hardware, and the instructions may be stored in a computer readable storage medium and loaded and executed by a processor. Therefore, the disclosed embodiments also provide the computer readable storage medium, on which a computer program or instructions are stored, which, when executed by a processor, may implement the processes of the embodiments in the video processing method described above. The computer readable storage medium may be a USB disk, a removable hard disk, a Read-Only Memory (ROM), a Random Access Memory (RAM), a magnetic disk, or an optical disk, which is capable of storing program codes.

Since the instructions stored in the readable storage medium can execute the steps in any video processing method provided in the embodiments of the present disclosure, beneficial effects that may be achieved by any video processing method provided in the embodiments of the present disclosure may be achieved, which are detailed in the foregoing embodiments and will not be described again here. The above operations may be implemented in the foregoing embodiments, and are not described in detail herein.

Figure 7:
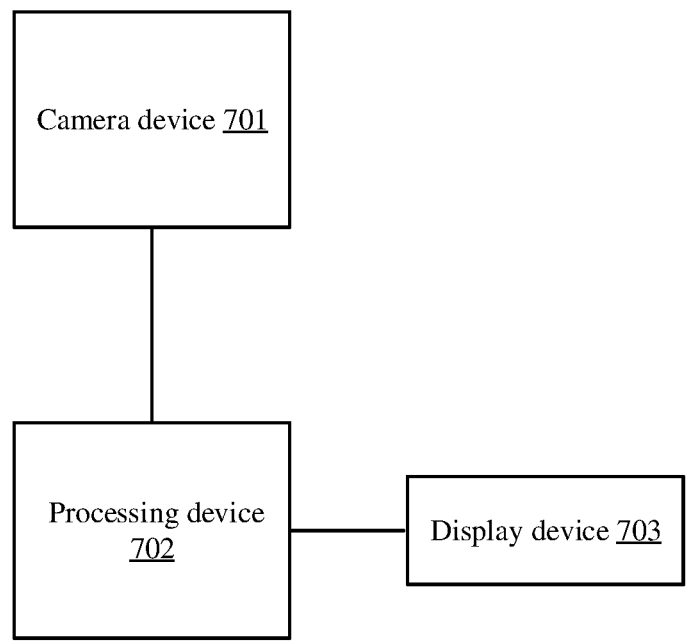
FIG. 7 is a schematic diagram of a teaching system according to an embodiment of the present disclosure.

FIG. 7 is a schematic diagram of a teaching system according to an embodiment of the present disclosure. The teaching system includes: a camera device 701, a processing device 702, and a display device 703. The camera device 701 is used to take a video. The processing device 702 is electrically connected to the camera device to receive a video from the camera device, and is capable of converting the video into a video with board writing unobstructed according to the method provided in this specification or other methods, then executes the video processing method provided in each of the above embodiments, and outputs a new video. The display device 703 is used to display the new video output by the processing device 702 on a display screen. It will be appreciated that the teaching system may be integrated into an electronic product including components such as a camera, a display, and a processor, on the one hand, and may be implemented as a plurality of devices communicating through a network (e.g., a local area network), on the other hand.

It should be noted that, in the description of the embodiments, the differences from the other embodiments are emphasized, and the same or similar parts between the embodiments can be understood by referring to each other. For system embodiments, reference is made to the description of the method embodiment section for the sake of substantial similarity with the method embodiments.

Further, it is noted that in the device and method of the present disclosure, it is apparent that each component or each step may be decomposed and/or recombined. The decomposition and/or recombination are to be considered equivalents of the present disclosure. Also, the steps of performing the series of processes described above may naturally be performed chronologically in the order described, but need not necessarily be performed chronologically, and some steps may be performed in parallel or independently of each other. It will be understood by those of ordinary skill in the art that all or any of the steps or components of the methods and device of the present disclosure may be implemented in any computing device (including processors, storage media, etc.) or network of computing devices, in hardware, firmware, software, or any combination thereof, which can be implemented by those of ordinary skill in the art using their basic programming skills after reading the description of the present disclosure.

Finally, it should be noted that: it should be understood that the above examples are only for clearly illustrating the present disclosure, and are not intended to limit the embodiments. Other variations and modifications will be apparent to persons skilled in the art in light of the above description. And are neither required nor exhaustive of all embodiments. And obvious changes and modifications can be made without departing from the scope of the present disclosure.

What is claimed is:

1. A video processing method, comprising:
   acquiring board writing images of consecutive frames from a video with unobstructed board writing;
   determining a difference area by calculating, at each pixel/block position, an image difference value between the board writing image of a current frame and a reference image, wherein the difference area at least identifies an edge difference of a same board writing character contained in both the board writing image of the current frame and the reference image, and the difference area is smaller than a total board writing coverage area;
   replacing a corresponding image block in the board writing image of the current frame with a corresponding image block in the reference image to obtain a new board writing image for each of the difference area;
   outputting the new board writing image to form a new video,
   wherein each board writing image after the board writing image of a first frame in the board writing images of the consecutive frames is sequentially selected as the board writing image of the current frame, and the reference image is the board writing image associated with a previous board writing image.

2. The video processing method according to claim 1, wherein for the board writing image of a second frame in the board writing images of the consecutive frames served as the board writing image of the current frame, the reference image is the board writing image of the first frame, and for the board writing image after the second frame served as the board writing image of the current frame, the reference image is a new board writing image associated with a previous board writing image.

3. The video processing method according to claim 1, wherein for the board writing image of a second frame in the board writing image of the consecutive frames served as the board writing image of the current frame, the reference image is an image obtained by fusing images of a plurality of frames without a board writing content in the video with unobstructed board writing.

4. The video processing method according to claim 1, wherein the video with unobstructed board writing is obtained by following steps: extracting a board writing content from an original video; completing the board writing content shielded by a teacher; and synthesizing a completed board writing content with the original video.

5. The video processing method according to claim 1, wherein determining the difference area comprises:
   calculating the image difference value in pixel level between the board writing image of the current frame and the reference image, and obtaining the difference area based on pixels with the image difference value larger than a difference threshold value, or, dividing the board writing image of the current frame and the reference image into a plurality of image blocks respectively, and taking the image block with the image difference value of the image blocks larger than a difference threshold as the difference area.

6. The video processing method according to claim 5, further comprising: expanding an irregular shaped difference area to a regular shaped difference area.

7. The video processing method according to claim 1, further comprising: adjusting a color of a writing board in the new board writing image.

8. The video processing method according to claim 7, wherein adjusting a color of a board in the new board writing image comprises:

obtaining a corrected board writing image, wherein the corrected board writing image only comprises a writable effective area, and comprise no frame of the writing board and no board writing content;

calculating an average value of each color channel of the corrected board writing image or obtaining a constant value of each color channel preset by a user;

for a dark color writing board, modifying a pixel value of each color channel in the new board writing image, which is smaller than a first threshold value, into an average value of the color channel or a constant value of each color channel preset by a user; and for a light color writing board, modifying a pixel value of each color channel in the new board writing image, which is larger than the second threshold value, into an average value of the color channel or a constant value of each color channel preset by a user.

9. A video processing device, comprising:

a board writing debouncing module for performing the video processing method according to claim 1 and outputting the new board writing image; and a board writing background color control module for adjusting a color of a writing board in the new board writing image, wherein the board writing debouncing module and the board writing background color control module are implemented by one or more processor.

10. The video processing device according to claim 9, wherein for the board writing image of a second frame in the board writing images of the consecutive frames served as the board writing image of the current frame, the reference image is the board writing image of the first frame, and for the board writing image after the second frame served as the board writing image of the current frame, the reference image is a new board writing image associated with a previous board writing image.

11. The video processing device according to claim 9, wherein for the board writing image of a second frame in the board writing image of the consecutive frames served as the board writing image of the current frame, the reference image is an image obtained by fusing images of a plurality of frames without a board writing content in the video with unobstructed board writing.

12. The video processing device according to claim 9, wherein the video with unobstructed board writing is obtained by following steps: extracting a board writing content from an original video; completing the board writing content shielded by a teacher; and synthesizing a completed board writing content with the original video.

13. The video processing device according to claim 9, wherein determining the difference area comprises:

calculating the image difference value in pixel level between the board writing image of the current frame and the reference image, and obtaining the difference area based on pixels with the image difference value larger than a difference threshold value, or, dividing the board writing image of the current frame and the reference image into a plurality of image blocks respectively, and taking the image block with the image difference value of the image blocks larger than a difference threshold as the difference area.

14. The video processing device according to claim 13, wherein the board writing debouncing module is further configured for performing the video processing by:

expanding an irregular shaped difference area to a regular shaped difference area.

15. An electronic device, comprising: a processor, a memory and a program stored in the memory and executable on the processor, wherein the program carries out steps of the video processing method according to claim 1 when executed by the processor.

16. A computer program stored on a non-transitory computer readable storage medium which carries out steps of the video processing method according to claim 1 when executed by the processor.

17. The video processing method according to claim 1, further comprises:

after replacing the corresponding image block and before outputting the new board writing image, performing character edge smoothing and/or character enhancement processing.

18. The video processing method according to claim 1, wherein the board writing images are represented in a multi-channel color space, and the image difference value for each pixel/block position is determined as a sum of all channel values in said color space or as a total grayscale value of that pixel/block position.

* * * * *